United States Patent
Duanis et al.

(10) Patent No.: US 11,107,504 B1
(45) Date of Patent: Aug. 31, 2021

(54) SYSTEMS AND METHODS FOR SYNCHRONIZING A VIDEO SIGNAL WITH AN AUDIO SIGNAL

(71) Applicant: Lightricks Ltd., Jerusalem (IL)

(72) Inventors: Sarel Duanis, Nes-Zyiona (IL); Ofir Bibi, Modiin (IL); Tavi Halperin, Efrat (IL)

(73) Assignee: Lightricks Ltd, Jerusalem (IL)

( * ) Notice: Subject to any disclaimer, the term of this patent is extended or adjusted under 35 U.S.C. 154(b) by 0 days.

(21) Appl. No.: 16/914,555

(22) Filed: Jun. 29, 2020

(51) Int. Cl.
- G11B 27/00 (2006.01)
- H04N 5/93 (2006.01)
- G11B 27/10 (2006.01)
- G11B 27/036 (2006.01)

(52) U.S. Cl.
CPC .......... *G11B 27/036* (2013.01); *G11B 27/005* (2013.01); *G11B 27/10* (2013.01)

(58) Field of Classification Search
CPC ....... G11B 27/00; G11B 27/10; G11B 27/036; G11B 27/005; H04N 5/93; H04N 27/00
USPC .......................... 386/278, 280, 285, 239, 248
See application file for complete search history.

(56) References Cited

U.S. PATENT DOCUMENTS

| | | | | |
|---|---|---|---|---|
| 6,111,183 A * | 8/2000 | Lindemann | ............ | G10H 7/002 84/622 |
| 9,741,360 B1 * | 8/2017 | Li | ........................ | G10L 21/028 |
| 2003/0194210 A1 * | 10/2003 | Shiiyama | ............. | G11B 27/005 386/344 |
| 2006/0115180 A1 * | 6/2006 | Adams | ................. | H04N 13/161 382/284 |
| 2010/0067798 A1 * | 3/2010 | Hung | ................. | G06K 9/00268 382/190 |
| 2011/0004467 A1 * | 1/2011 | Taub | ...................... | G11B 27/34 704/207 |
| 2020/0074705 A1 * | 3/2020 | Berger | .................... | G06T 11/60 |

OTHER PUBLICATIONS

Wenner, S., Bazin, J.-C., Sorkine-Hornung, A., Kim, C. and Gross, M. (2013), Scalable Music: Automatic Music Retargeting and Synthesis. Computer Graphics Forum, 32: 345-354.

Zicheng Liao et al. audeosynth: Music-Driven Video Montage ;ACM Transactions on Graphics (special issue of SIGGRAPH 2015), 34(4).

(Continued)

*Primary Examiner* — Daquan Zhao
(74) *Attorney, Agent, or Firm* — Pearl Cohen Zedek Latzer Baratz LLP

(57) ABSTRACT

A system and method for synchronizing a video signal with an audio signal, including: extracting at least one parameter of an audible attribute of the audio signal, the audible attributes including temporal characteristics of the audio signal such as audio intensity, beats, pitch energy, meter, auditory novelty, onset timing and subsections, and functions applied to any of the attributes in the list; and applying manipulations on the visual signal, wherein parameters of the manipulations are affected by the parameters of the audible attributes. The system and method may further include calculating a probability density function based on the audible attribute, wherein the manipulations are applied based on the probability density function.

20 Claims, 9 Drawing Sheets

(56) References Cited

OTHER PUBLICATIONS

Wikipedia; Loudness; Retrieved from https://en.wikipedia.org/w/index.php?title=Loudness&oldid=958303845, May 23, 2020.
Wikipedia; Rhythm; Retrieved from https://en.wikipedia.org/w/index.php?title=Rhythm&oldid=963060132 Jun. 17, 2020.
Wikipedia; Pitch (music); Retrieved from https://simple.wikipedia.org/w/index.php?title=Pitch_(music)&oldid=6867418; Mar. 15, 2020.
Wikipedia; Harmony; Retrieved from https://en.wikipedia.org/w/index.php?title=Harmony&oldid=959119075; May 27, 2020.
Wikipedia; Metre (music); Retrieved from https://en.wikipedia.org/w/index.php?title=Metre_(music)&oldid=962299441; Jun. 13, 2020.
Wikipedia; Onset (audio); Retrieved from https://en.wikipedia.org/w/index.php?title=Onset_(audio)&oldid=927513405; Nov. 22, 2019.
Wikipedia; Short-time Fourier transform; Retrieved from https://en.wikipedia.org/w/index.php?title=Short-time_Fourier_transform&oldid=949310451; Apr. 5, 2020.
Simon Dixon; Onset Detection Revisited; Proc. of the 9th Int. Conference on Digital Audio Effects (DAFx'06), Montreal, Canada, Sep. 18-20, 2006.
Wikipedia, Spectral density; Retrieved from https://en.wikipedia.org/w/index.php?title=Spectral_density&oldid=954893938; May 4, 2020.
Wikipedia, Signal; Retrieved from https://en.wikipedia.org/w/index.php?title=Signal&oldid=960351208; Jun. 2, 2020.
Daniel P.W. Ellis; Beat Tracking by Dynamic Programming; LabROSA, Columbia University, New York, Jul. 16, 2007.
Abe Davis; Maneesh Agrawala, Visual Rhythm and Beat; ACM Transactions on Graphics, vol. 37, No. 4, Article 122. Publication date: Aug. 2018.
Audiosurf, LLC Retrieved from www.audio-surf.com Jun. 18, 2020.

\* cited by examiner

SYSTEMS AND METHODS FOR SYNCHRONIZING A VIDEO SIGNAL WITH AN AUDIO SIGNAL

FIELD OF THE INVENTION

The present invention relates generally to the field of video editing, and specifically to synchronizing a video signal with an audio signal.

BACKGROUND

An audio signal may be an array of magnitude values (e.g. digital or computerized values) sampled at a certain rate along the time axis. This raw signal in itself does not necessarily correlate directly with perceptually meaningful audible characteristics. Thus, editing visual content in order to temporally match it with a specified audio signal in an appealing or accurate manner is a hard task which requires manually detecting and marking those perceptually meaningful audible characteristics in the audio signal, and matching them with visually perceptive effects in the video clip. This requires professional skill, human judgment and experience, and time-consuming manual editing.

SUMMARY

According to embodiments of the invention, a system and method for synchronizing a video signal with an audio signal may include: extracting at least one parameter of an audible attribute of the audio signal; and applying manipulations on the visual signal, wherein parameters of the manipulations are affected by the parameters of the audible attributes.

Embodiments of the invention may include, calculating a probability density function based on the audible attribute, wherein the manipulations may be applied based on the probability density function.

According to embodiments of the invention, the probability density function may be calculated by for example generating at least one function wherein each of the at least one function provides, in each time point, the value of an audible attribute in relation to values of the audible attribute at all other time points in the audio signal; and calculating a weighted average of the at least one of function.

According to embodiments of the invention, applying manipulations on the visual signal may include inserting at least one effect selected from a plurality of visual effects, wherein each of the visual effects comprise manipulations applied on the visual content of individual video frames of the video signal.

According to embodiments of the invention, example visual effects may be selected from: color filters, image rotation, image zoom, edge amplification and overlays of external content.

According to embodiments of the invention, applying manipulations on the visual signal may include inserting at least one effect selected from a plurality of temporal effects, wherein the temporal effects comprise manipulations of how the individual video frames of the video signal are sequenced over time.

According to embodiments of the invention, the temporal effects may include interlacing frames taken from a plurality of sources.

According to embodiments of the invention, the temporal effects may be selected from: speed change, changing the order of frames inside the video, transitions, repetitions, remixing of pixel locations, and reversal playback.

According to embodiments of the invention, the audible attributes may include temporal characteristics of the audio signal.

According to embodiments of the invention, the audible attributes may be selected from: audio intensity, beats, pitch energy, meter, auditory novelty, onset timing and sub sections, and functions applied to any of the attributes in the list.

According to embodiments of the invention, a system and method for synchronizing a video signal with an audio signal may include: extracting at least one audio characteristic of the audio signal; and using the audible characteristics to control visual properties of the video.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
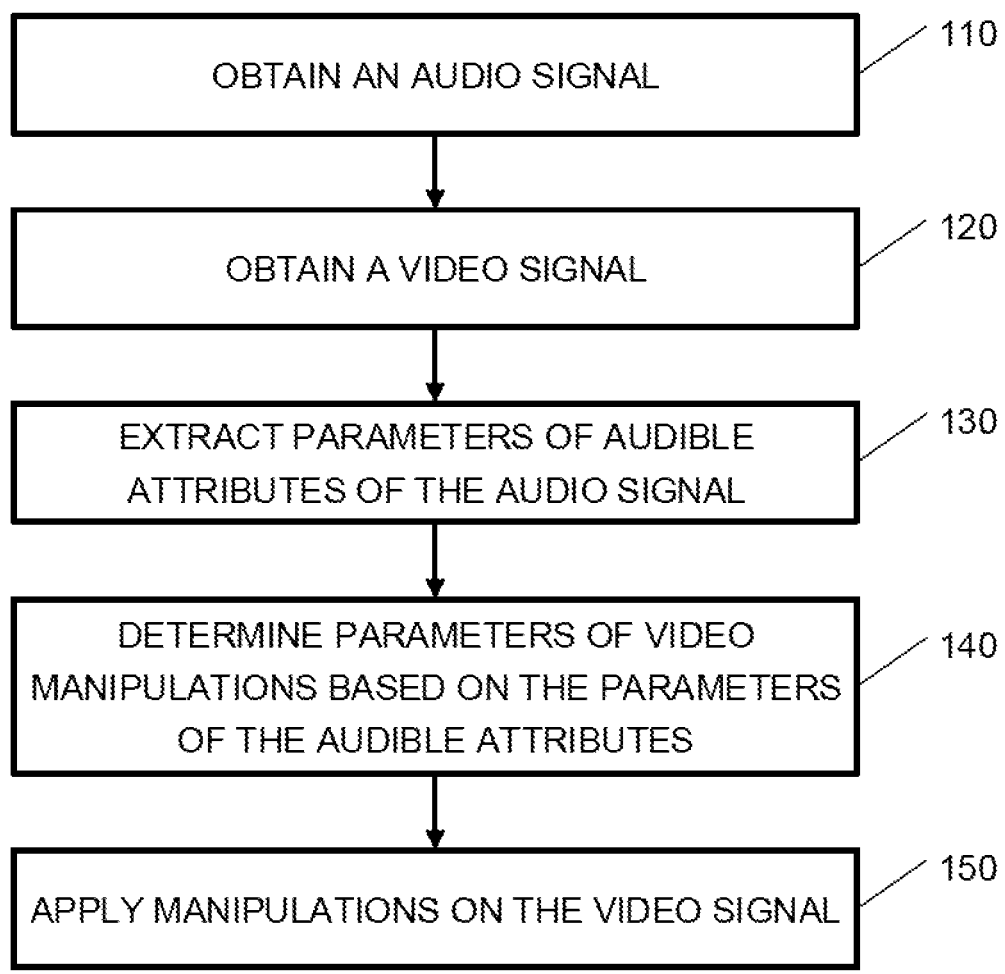
FIG. 1 is a flowchart of a method for synchronizing a video signal with an audio signal, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may provide a system and method for synchronizing a video signal with an audio signal. For example, a computer may edit and alter the video signal to produce an altered video signal. In some embodiments, synchronization may include performing manipulations or effects on the video signal based on attributes of the audio signal. For example, the timing of the activation of the manipulation may be synchronized with timing of extracted audio attributes, or the magnitude of the manipulation may be affected by or adjusted according to the extracted audio attributes, so that the video effect temporally match the audio. Each effect may be parameterized by one or more parameters controlling its appearance, for example its timing, intensity, duration, strength, etc. According to embodiments of the invention, parameters of the manipulations may be affected by or determined based on the parameters of the audible attributes. For example, the timing, intensity, duration and strength of manipulations applied on a video signal may be determined based on one or more audible attributes.

According to embodiments of the invention, video and audio may be related by a way of binding visual or temporal effects to the audio signal, such that the audio signals (or parameters extracted from the audio signal) act as the parameters controlling the visual and temporal effects. Thus, editing a video signal based on audible attributes according to embodiments of the invention may provide the appearance of perfectly or accurately synchronized video and audio. Therefore, embodiments of the invention may improve the technology of video editing by providing an automatic tool for performing synchronization between video (or video manipulations) and audio. In some embodiments, a graphical user interface may be supplied to end users, that may let them define and edit these bindings between the audio signals and the visual and temporal effects. With the aid of such an interface, the process of synchronizing video to audio tracks in an appealing manner which resembles a well edited video clip may become very fast and easy, and can be used by a layman.

Reference is made to FIG. 1, which is a flowchart of a method for synchronizing a video signal with an audio signal, according to embodiments of the invention. An embodiment of a method for calculating predicted adherence may be performed, for example, by the systems shown in FIG. 7.

In operation 110, an audio signal may be obtained. As used herein an audio signal may refer to a digital audio recording as known in the art, including for example an array of magnitude values sampled at a certain rate along the time axis. For example, the audio signal may include a recording of music. This raw signal in itself does not necessarily correlate directly with perceptually meaningful audible characteristics. The audio signal may be obtained in any digital format representing the array of magnitude values sampled at a certain rate along the time axis. Other formats of audio signals, e.g., analog or digital. e.g., compressed audio signals such as mp3 audio. Advanced Audio Coding (AAC) audio, etc., may be converted before being further processed.

In operation 120 a video signal. e.g., at least one video clip, may be obtained. The video signal may be obtained in any applicable digital format. The video signal may be a video or moving image recording as known in the art.

In operation 130, at least one parameter of at least one audible attribute of the audio signal, also referred to herein as an audio characteristic of the audio signal, may be detected or extracted. According to embodiments of the invention, the audible attribute (from which parameter are extracted to control the video signal) may be selected by a user, e.g., using a user interface. Additionally or alternatively, the audible attribute may be selected by the system. e.g., randomly. An audible attribute may include temporal characteristics of the audio signal, such as audio intensity (also referred as loudness), beats, pitch energy, meter, auditory novelty, onset timing, subsections, etc., and functions applied to any of the audible attributes. A parameter of an audible attribute may include characteristics of the audible attribute such as timing, magnitude, etc.

According to embodiments of the invention, pitch energy, P, may be extracted from the spectrogram of the audio signal. To calculate the spectrogram, X, of the audio signal a short-time Fourier transform (STF) may be used, e.g., using Equation 1.

$$X(n,k) = \sum_{m=-\frac{N}{2}}^{\frac{N}{2}-1} x(hn+m)w(m)e^{-\frac{2j\pi mk}{N}} \qquad \text{(Equation 1)}$$

Where w denotes a window function, N stands for the window size (expressed as the number of samples in a window or time frame), h denotes the hop size (expressed as the number of samples between consecutive windows or time frames in the time domain), X(n, k) represents the magnitude of the kth frequency bin of the n'th time frame of the spectrogram.

Pitch energy, P, may be extracted from the spectrogram by averaging energies across all frequencies within a specific frequency band, for example, using Equation 2. The pitch energy may be indicative of the volume of notes in a range of frequencies. Other methods for extracting pitch energy may be used.

$$P(n) = \frac{1}{N} \sum_{k=f_{min}}^{f_{max}} X(n,k)^\theta \qquad \text{(Equation 2)}$$

Where the frequency range is [$f_{min}$,$f_{max}$], and θ is a parameter that may be tuned based on the application. Increasing θ may give more weight to relatively high magnitudes of X and less weight to relatively low magnitudes of X.

According to some embodiments, the magnitude of the pitch energy, or parameters derived from the pitch energy may control or affect the manipulations applied on the visual or video signal. For example, the pitch energy may be measured in a high frequency band, P_high, and in a low frequency band, P_low, such that when P_high is above a first threshold, a manipulation is applied, e.g., the video is played in high speed, and when P_low is below a second threshold, a second manipulation is applied, e.g., the video is played in slow motion.

Onset timing, or simply an onset, may refer to the start of a musical note. According to embodiments of the invention, spectral flux, SF, may be calculated and used to extract onsets of music notes in certain ranges of frequencies. Spectral flux may be a continuous function indicating how quickly the power spectrum of an audio signal is changing over time. A Boolean signal, O(n), indicating a beginning of a note in the audio signal may be generated by finding the peaks of the spectral flux SF(n).

$$SF(n) = \sum_{k=f_{min}}^{f_{max}} H(|X(n,k)| - |X(n-1,k)|) \qquad \text{(Equation 3)}$$

Where H is an operation defined by $$H(x) = \frac{x + |x|}{2},$$

and the frequency range is [$f_{min}$,$f_{max}$]. The onsets may be found using a peak finding method with a threshold on peak prominence:
- Finding peaks in SF(n) e.g., points with two neighbors (one to the left and one to the right) that are lower than them.
- Finding two lowest signal values, one in a given area on the left side and one a given area on the right side of every peak.
- The larger value between the two low values found may be defined as the "lowest contour".
- If the difference between the peak height and the lowest contour height is larger than a threshold, mark that peak as 1 for the onset. If it is lower than the threshold, mark that peak as 0 for the onset.

Figure 2A:
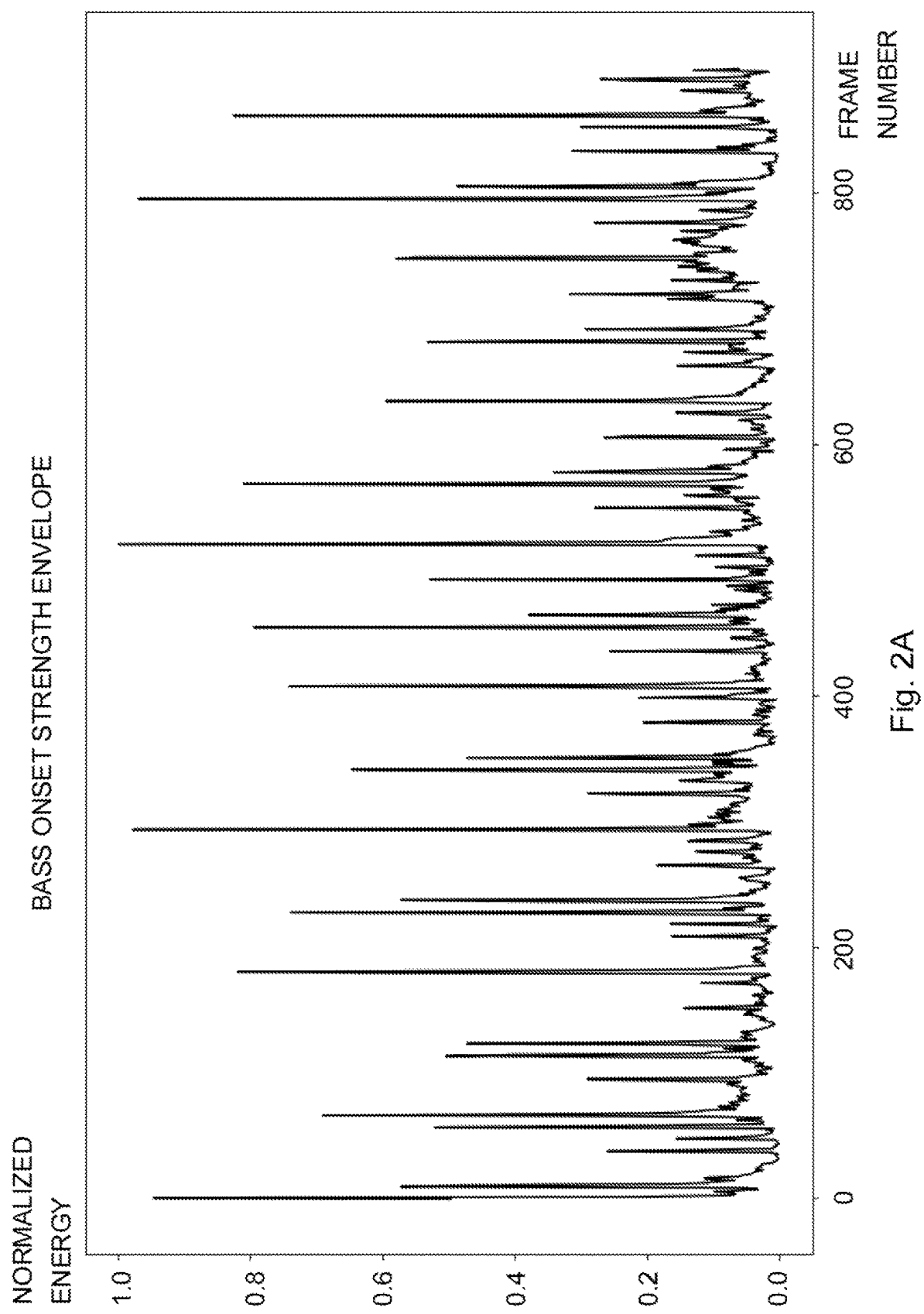
FIG. 2A depicts bass onset strength envelope of an audio signal, extracted according to embodiments of the invention.
Figure 2B:
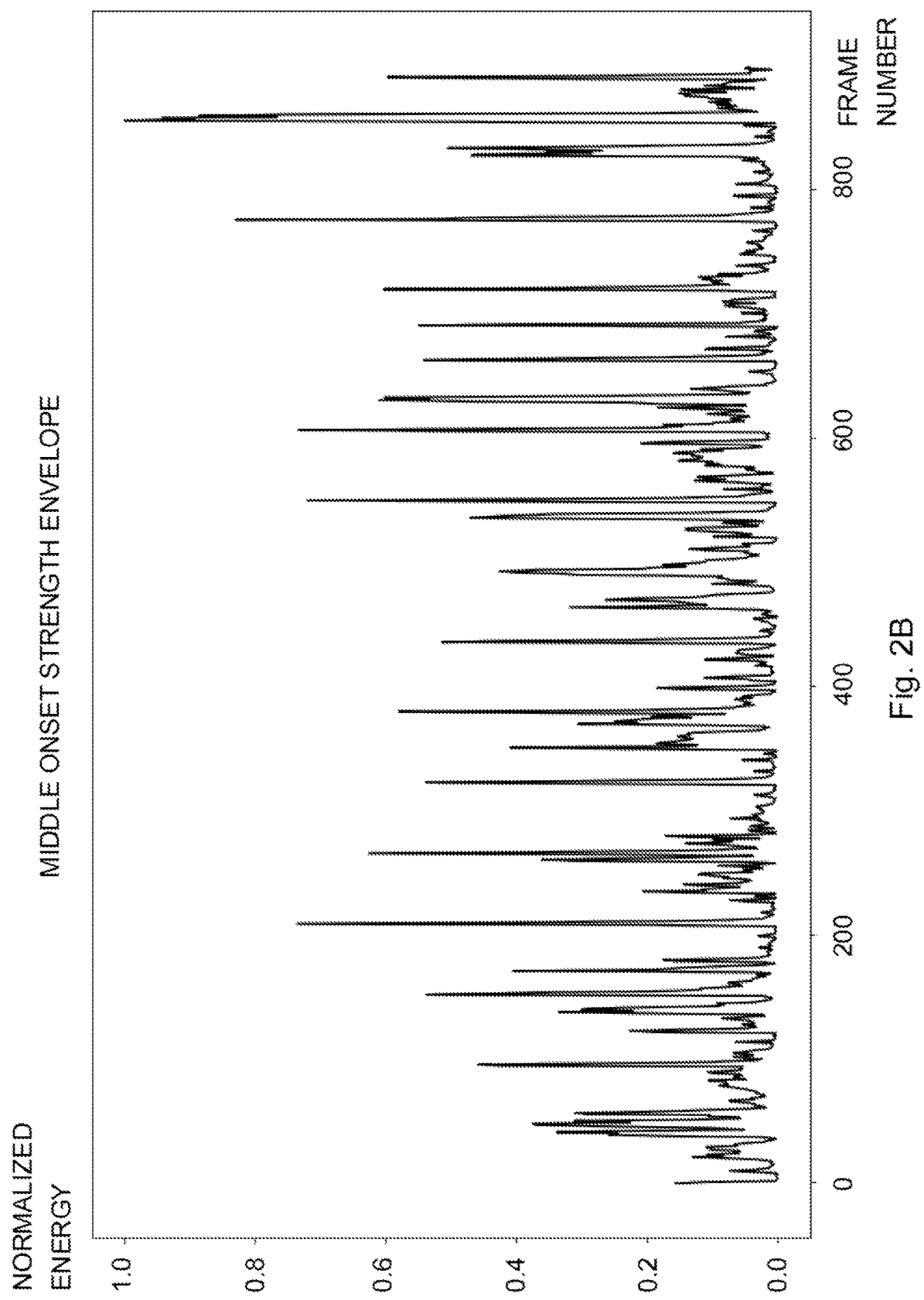
FIG. 2B middle onset strength envelope, extracted according to embodiments of the invention.
Figure 2C:
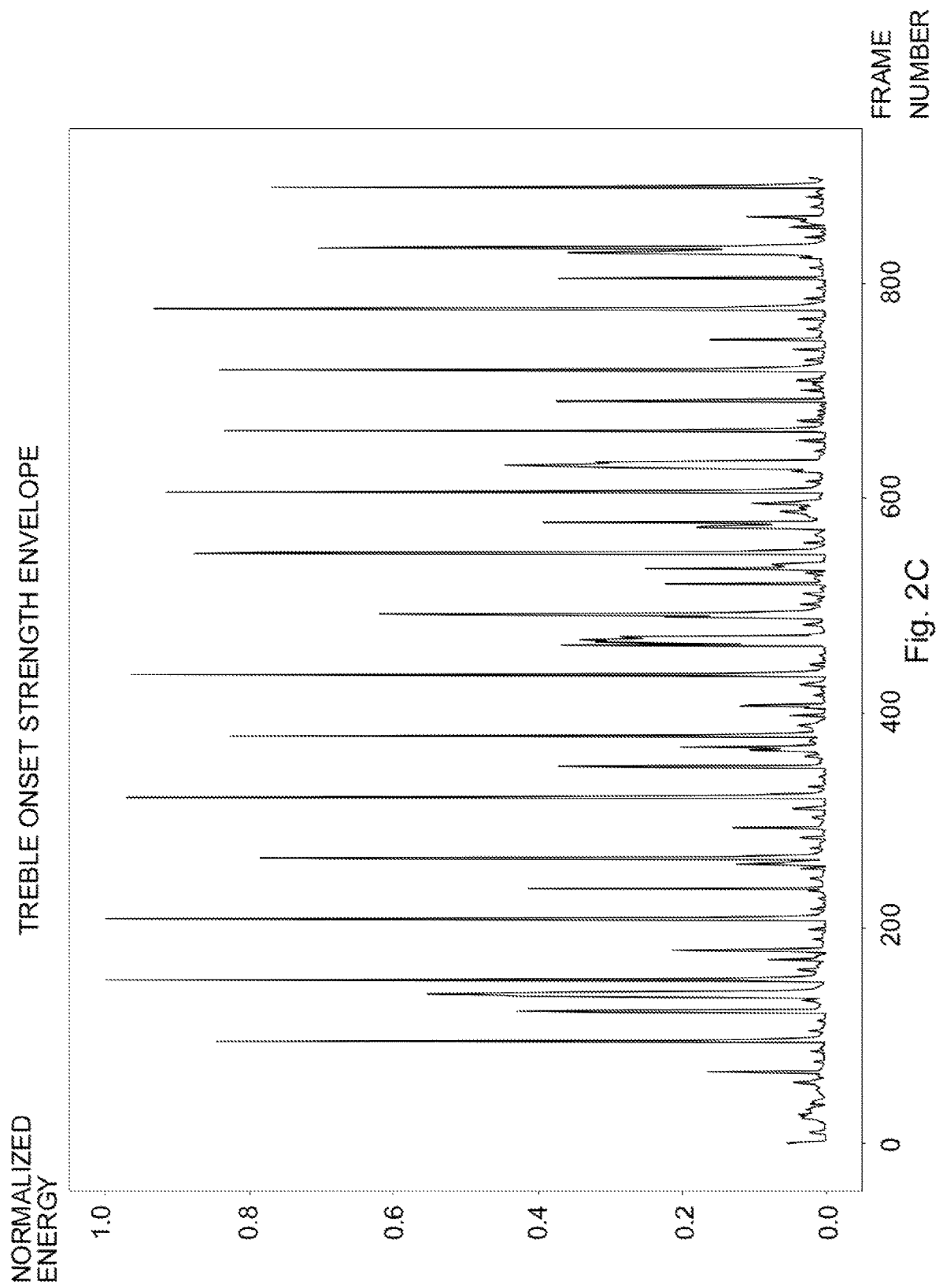
FIG. 2C depicts treble onset strength envelope extracted according to embodiments of the invention.

Thus, finding the peaks of SF(n) may provide the location of onsets at frequency rage [$f_{min}$,$f_{max}$]. Different ranges of frequencies may be used to find onsets of different musical notes. Other methods for extracting onset timing may be used. The meter feature may be extracted by measuring the time interval between consecutive onsets. FIGS. 2A-C depict bass middle and treble onsets, respectively, of an audio signal extracted according to embodiments of the invention.

Beats may refer to regularly repeating moments in the music, for example where a listener would clap in congruence with music. Beats of the music in the audio sample may be extracted using any applicable method for audio beat tracking. For example, the beats may be detected using beat tracking by dynamic programming. Specifically, assuming that every beat coincides with a high onset value and the distance between consequent beats is constant, $\tau_p$, may indicate the ideal beat spacing. Dynamic programming may be used to maximize the following objective:

$$C(\{t_i\}) = \sum_{i=1}^{N} O(t_i) + \alpha \sum_{i=2}^{N} F(t_i - t_{i-1}, \tau_p) \qquad \text{(Equation 4)}$$

Where O(t) is the onset strength envelope, F(Δt, $\tau_p$) is a function that measures the consistency between an inter-beat interval Δt and $\tau_p$. The onset strength envelope may refer to a mean filter of the spectral flux, SF(n), or the audio signal in a range of frequencies. The following is the recursive function of the dynamic programming:

$$C^*(t) = O(t) + \max_{\tau=0...t} \{\alpha F(t-\tau, \tau_p) + C^*(\tau)\} \qquad \text{(Equation 5)}$$

Figure 3:
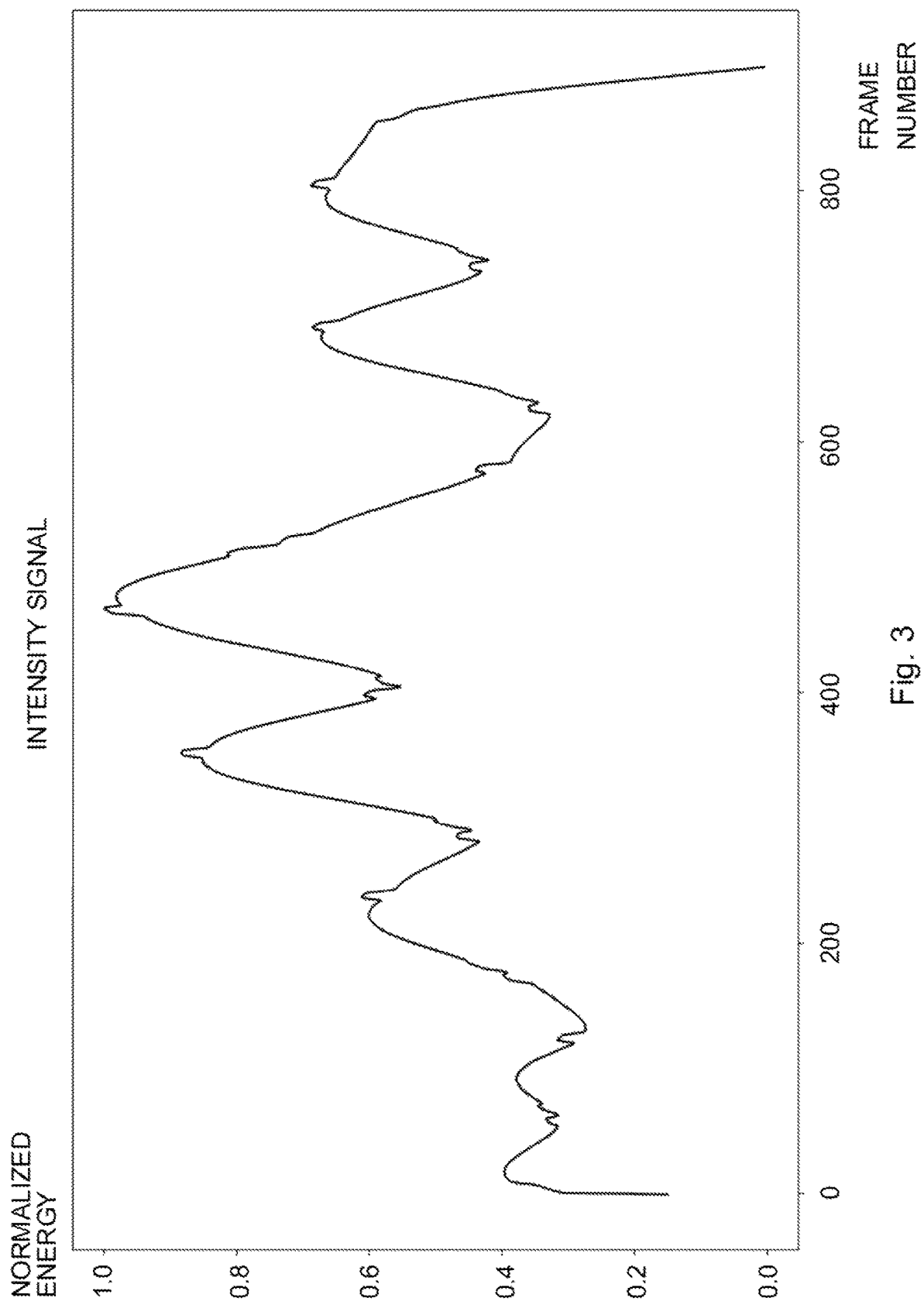
FIG. 3 depicts an intensity of an audio signal, calculated according to embodiments of the invention.

The intensity or loudness may be a subjective quality of the audio signal. However, as used herein, the intensity or loudness feature may refer to an estimation of the perceived intensity or loudness. The intensity or loudness feature, I, may be extracted by averaging the audio amplitudes across all frequencies in every time frame and applying convolution by time with a Hamming window, for example, as indicated in Equations 6 and 7. Other methods for calculating intensity may be used. FIG. 3 depicts an intensity of an audio signal calculated according to embodiments of the invention.

$$P(n) = \frac{1}{N} \sum_{k=-\frac{N}{2}}^{\frac{N}{2}-1} X(n,k)^\theta \qquad \text{(Equation 6)}$$

$$I(n) = (P * \text{HammingWindow})(n) \qquad \text{(Equation 7)}$$

Figure 4:
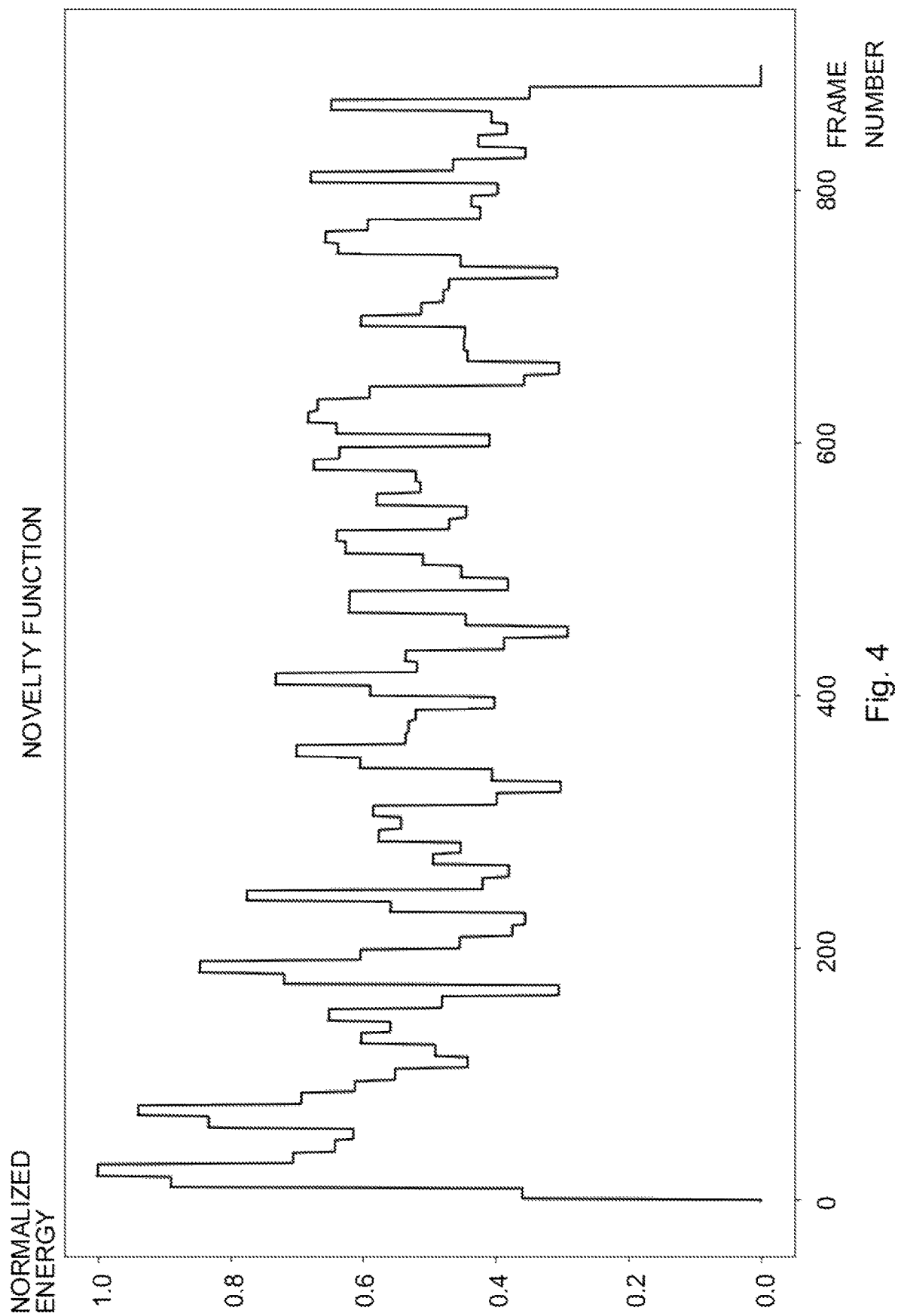
FIG. 4 depicts a novelty function of an audio signal, calculated according to embodiments of the invention.

As used herein, auditory novelty (also referred to as novelty) may refer to an amount of conceptual change in the music. For example, novelty may be calculated by:
- Slicing the audio signal to sections by beats (e.g., the beats divide the audio signal into sections).
- Creating Mel-frequency cepstral coefficients (MFCC) descriptor for every section.
- Creating distance matrix between all MFCCs using, for example, Spearman's rank correlation.
- Applying a weighted detection kernel along the diagonal of the matrix to obtain a novelty function. The novelty function may provide an approximation of the amount of change in the music (e.g., in the audio signal). FIG. 4 depicts a novelty function of an audio signal calculated according to embodiments of the invention.
- Finding peaks of the novelty function. The location of the peaks of the novelty function may provide the timing where a significant change occurs in the music. According to some embodiments, the peaks of the novelty function may divide the audio signal to subsections (other divisions may be used).

According to embodiments of the invention, the extracted features or audible characteristics may be directly used to control the manipulations on the visual signal (e.g., on the video signal or video clip). For example, the extracted audio features or characteristics may be used to control a process what alters the video recording or clip, for example in order to change the visual appearance of the video clip by inserting or applying at least one visual effect and/or temporal effect. Additionally or alternatively, the extracted features may be further manipulated, e.g., by applying one or more functions, referred to herein as modulation functions, such as cumulative sum, step function, toggle function etc. and using the result to control the manipulations on the visual signal. For example, a toggle function may output a signal that alters between 1 and 0 every time there is a certain change in the extracted feature, which may be then used to turn an effect or video manipulation on or off.

In operation 140 parameters of video manipulations may be determined based on or affected by the parameters of the audible attributes. According to embodiments of the invention, the type of video manipulations (controlled by the audible attributes) may be selected by a user, e.g., using a user interface. Additionally or alternatively, the video manipulations may be selected by the system, e.g., randomly.

Visual effects may be created by applying manipulations on the visual content of individual video frames, as indicated in block 150. Thus, audible characteristics may be used to control visual properties of the video. Each effect or manipulation may be parameterized by one or more parameters controlling the manipulation and the appearance of the effect. The parameters may control, for example, the intensity, duration, strength etc. of the manipulation. Applying manipulations on the visual signal may include inserting or applying at least one visual effect and/or temporal effect, to alter the video to produce, for example, an altered video which includes or is altered by the visual or video effect. Visual effects may include manipulations applied on the visual content of individual video frames of the video signal. Temporal effects may include manipulations of how the individual video frames of the video signal are sequenced over time. Both the visual effects and the temporal effects may be parameterized by one or more parameters controlling the appearance of the effect.

According to embodiments of the invention, each of the visual effects may be parameterized by one value indicating the intensity of the effect. For example, zoom may be parameterized by the zoom amount, brightness effect may be parameterized by the brightness amount, etc. In a case of temporal effects, the controlled parameter may generally be the size of the intervals in which frames are sampled from the video in every point in time. For example, interval of 1 may take the consecutive frame of the video as the next frame to show, interval of N may jump N frames in the video and take the $N^{th}$ frame as the next frame to show. N may be any real number. All video source frames are concatenated one after the other. So choosing a specific N can cause to a source change.

The values extracted from the audio signal may be used directly as the value affecting the selected visual or temporal effect parameter. For example, if a zoom effect is applied and intensity is selected as the affecting audible attribute, then the zoom amount or scale may equal the intensity, I, calculated for example according to Equation 7. Thus, if the intensity feature, I, equals 4 (four) at some point in the audio signal, and a zoom effect is applied at this point, the zoom amount or scale may equal 4 as well. In some embodiments, the extracted values may be further adjusted or manipulated by applying a modulation function as disclosed herein, and then the result of the modulation function may be taken to be the value of the visual or temporal effect parameter. For example, if beats is the audible attribute used to control visual effects, and the selected effect is a zoom effect, a modulation function (e.g., a threshold) may be used to manipulate O(t), the onset strength envelope, (e.g., as calculated in Equation 4) to zero a beats function inbetween beats and to give the beats function a certain value where beats are found. Thereafter, whenever a beat occurs in the music, the output of the beats function may rise and so the visual effect intensity, in this case the zoom amount or scale may increase.

In some embodiments, a single parameter of an audible attribute may affect or control the manipulation applied on the video signal. In some embodiments more than one parameter related to one or more audible attributes may affect or control the manipulation applied on the video signal. For example, parameters related to the beats may affect, determine or control the timing of a manipulation, while parameters related to the intensity may affect, determine or control the magnitude of a manipulation. In some embodiments a composition of a set of audible attributes may affect, determine or control the parameters of the manipulation.

Examples of visual effects may include:

Applying color filters—the parameters of a color filter may include brightness, saturation and hue of a color value, those parameters may be controlled by the extracted audible attributes.

Image rotation—the parameters of the image rotation may include the rotation angle, that may be controlled by the extracted audible attributes.

Image zoom—the parameters of the zoom may include the scale of the zoom, that may be controlled by the extracted audible attributes.

Image translation—the parameters of the image translation may include the amount of translation in each axis, which may be controlled by the extracted audible attributes.

Edge amplification—the parameters of the edge amplification may include the intensity of the amplification, that may be controlled by the extracted audible attributes.

Overlays of external content—the parameters of the overlays may include the position of the external content on the frame, which may be controlled by the extracted audible attributes.

Remixing of pixel locations.

Examples for temporal effects may include:

Speed change, e.g., manipulating the time intervals between consecutive video frames by adding or subtracting frames. The interval between frames may be controlled by the extracted audible attributes.

Intrinsic clip cuts, e.g., changing the order of frames inside a video clip. In some embodiments, the extracted audible attributes may affect or control the order of frames inside a video clip. For example, when an extracted audible attributes reaches a certain value, the next frame taken from the video will be two or more frames ahead, or one or more frames behind, instead of the next frame, and the exact distance to the next frame may be controlled by the extracted audible attributes.

Transitions, e.g., interlacing frames taken from a plurality of sources. The timing of changing the source of the frames may be controlled by the extracted audible attributes.

Repetitions, e.g., duplicating sequence of frames. In some embodiments, repetitions may be controlled by the extracted audible attributes by detecting repetitions in at least one of the extracted audible attributes and coordinating repetitions in the visuals with the repetitions in the extracted audible attributes.

Reversal playback, e.g., reversing the order of frames or negative frame jumps. In some embodiments, reversing the order of frames may be controlled by the extracted audible attributes if an audible attributes was first on the rise and then in decline, for instance pitch, a reversal playback may be coordinated with the decline of the audible attributes.

Other temporal and visual effects may be used.

As disclosed herein, the video effects or manipulations may be affected by parameters of the audible attributes. According to some embodiments, the effects may be distributed evenly along the video signal. For example, if beats is the audible attribute used to control visual effects applied on the video signal, an effect may be generated or activated whenever a beat is detected, on every other beat, every number of beats, etc. Additionally or alternatively, video effects affected by parameters of the audible attribute may be applied or activated randomly. According to some embodiments of the invention, a more appealing composition of effects along the audio signal, e.g., spread and timing of every effect across the music timeline, may be created using a probability density function. A probability density function may be generated for every effect. Thus, placements and density for every type of effect may be determined using the probability density function generated for this effect.

Figure 5:
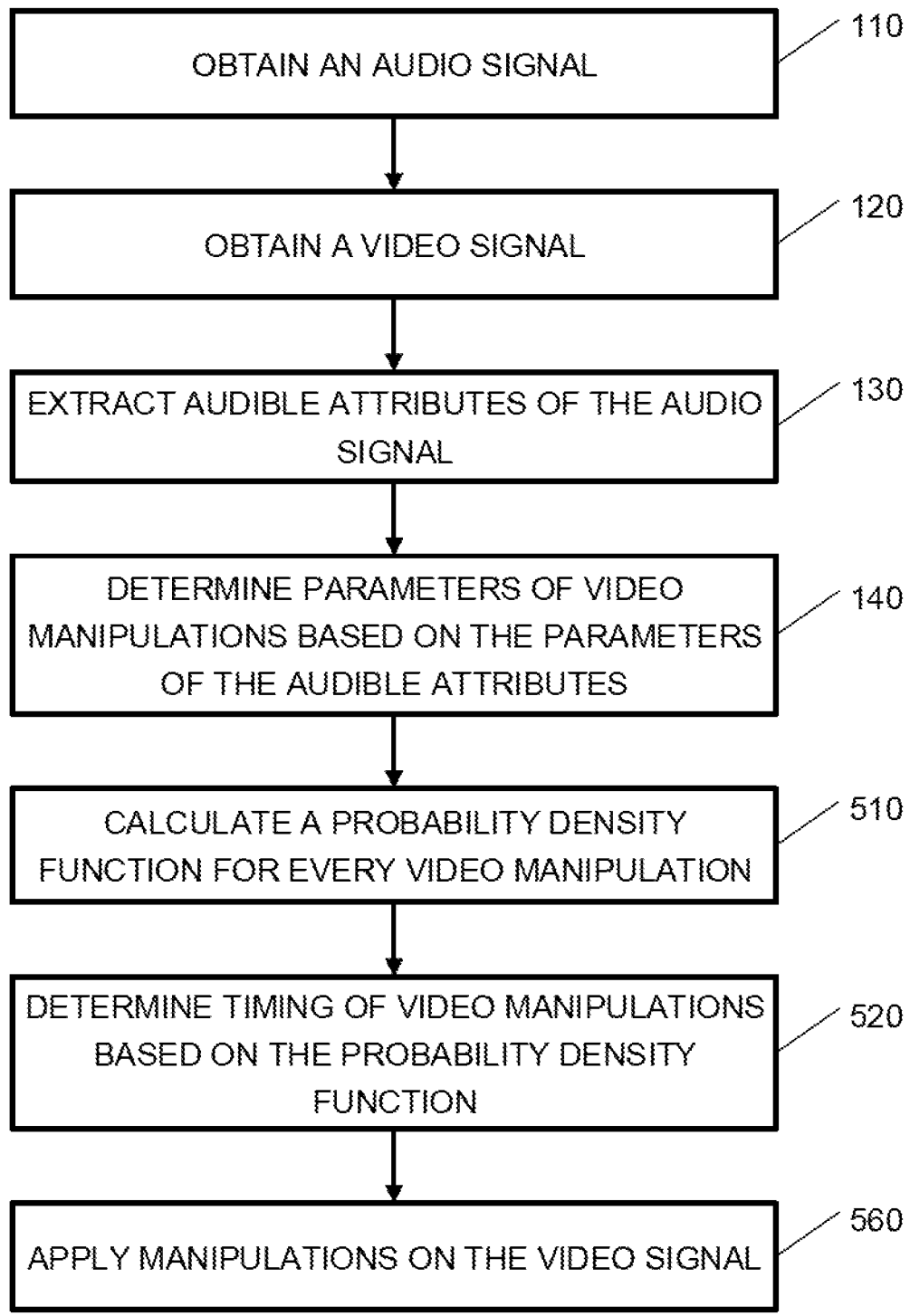
FIG. 5 is a flowchart of a method for synchronizing a video signal with an audio signal using a probability density function, according to embodiments of the invention.

Reference is made to FIG. 5, which is a flowchart of a method for synchronizing a video signal with an audio signal using a probability density function, according to embodiments of the invention. An embodiment of a method for calculating predicted adherence may be performed, for example, by the systems shown in FIG. 7. Operations 110-140 of embodiments of the for synchronizing a video signal with an audio signal using a probability density function are similar to operations with similar reference numerals presented in FIG. 1 and will not be described again.

In operation 510 a probability density function may be calculated based on one or more of the audible attributes. The probability density function may refer to an array of values that sums up to 1. Using this function, a subgroup of activation points may be chosen pseudo randomly from all the possible activation points derived from the audio attributes. A possible activation point may refer to any occurrence of an audible attribute that is discreet and represents an event in time, such as onsets, beats or peaks of the novelty function. The probability density function may control the probability of selecting a certain activation point as a pivot point to start or end an effect—the higher the density function is, the higher the probability to choose this activation point.

The probability density function, PDF, may represent, or be calculated based on a single parameter of an audible attribute, such that in each time point the parameter is measured in relation to the cumulative value of the parameter along the entire audio signal. Examples of probability density functions, PDF, may include but are not limited to:

Intensity probability density function, PDF_I(n), may be calculated by, for example:

$$PDF\_I(n) = \frac{I(n)}{\sum_n I(n)} \qquad \text{(Equation 8)}$$

Onsets probability density function, Onsets_PDF(n), may indicate times where more than one onset is played during a time window with a duration k:

$$H\_O(n) = (O * \text{HammingWindow}(k))(n) \qquad \text{(Equation 9)}$$

$$\text{Onsets\_PDF}(n) = \frac{H\_O(n)}{\sum_n H\_O(n)} \qquad \text{(Equation 10)}$$

The novelty function itself or areas around peaks of the novelty function may be used to calculate a novelty probability density function. Novelty_PDF(n). For example, let NOV(n) denote the peaks of the novelty function, where NOV(n)=1 if the novelty function has a peak in sample n and NOV(n)=0 elsewhere. The novelty probability density function, Novelty_PDF(n), may be calculated by, for example:

$$H\_NOV(n) = (NOV * \text{Gaussian}(k))(n) \qquad \text{(Equation 11)}$$

$$\text{Novelty\_PDF}(n) = \frac{H\_NOV(n)}{\sum_n H\_NOV(n)} \qquad \text{(Equation 12)}$$

Simple bars beginnings may be used to calculate a bars probability density function, Bars_PDF(n). For example, let BAR(n) denote a bars function, where BAR(n)=1 every fourth beat and BAR(n)=0 elsewhere. The bars probability density function, Bars_PDF(n), may be calculated by, for example:

$$H\_BAR(n) = (BAR * \text{Gaussian}(k))(n) \qquad \text{(Equation 13)}$$

$$\text{Bars\_PDF}(n) = \frac{H\_BAR(n)}{\sum_n H\_BAR(n)} \qquad \text{(Equation 14)}$$

Another probability density function that may be used is a probability density function of a uniform distribution over time, which is basically a constant function:

$$U(n) = 1/N \qquad \text{(Equation 15)}$$

Where N is the length of the audio signal.

A probability density function. e.g., any of the probability density functions calculated as disclosed herein, may be associated with a video effect or a type of manipulation. Additionally or alternatively, a probability density function for a video effect or a type of manipulation may be calculated as a weighted mixture of a plurality of probability density functions with equal or different weight for each one of the plurality of probability density functions.

Figure 6:
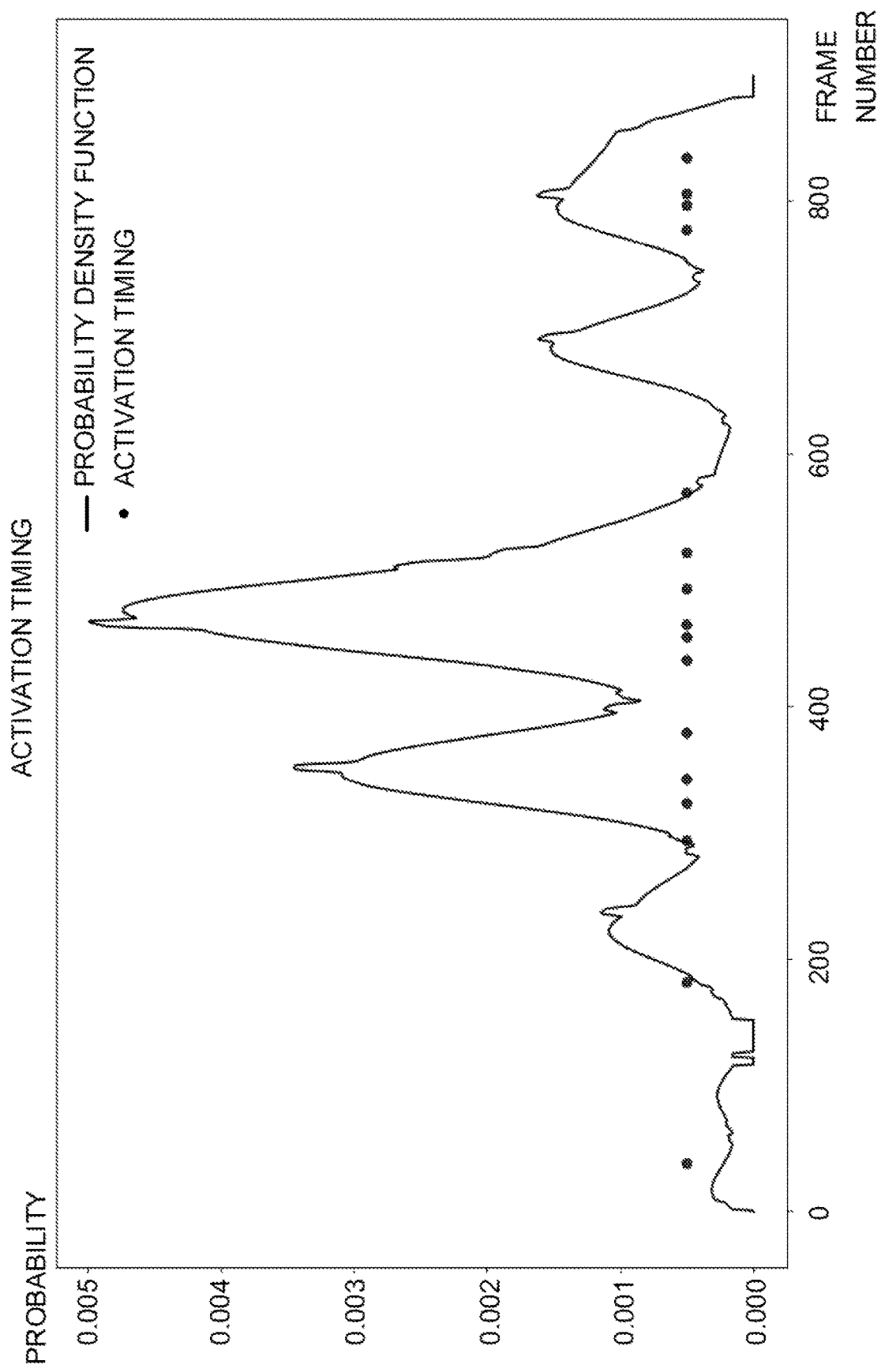
FIG. 6 depicts an example of a probability density function and selected onsets, according to embodiments of the invention.

In operation 560 the manipulations may be applied to the video signal based on the probability density function. Thus, the probability of applying an effect or manipulation at video frame n equals the value of the associated probability density function at point n. According to some embodiments, the method may be refined by zeroing the associated probability density function at an area around a chosen activation so that no other activation will be chosen within a certain range near the previous ones. FIG. 6 depicts an example of a probability density function (continuous line) and selected activation timing (dotted line), according to embodiments of the invention. It may be seen that there are more activations in areas of higher probability density function.

Figure 7:
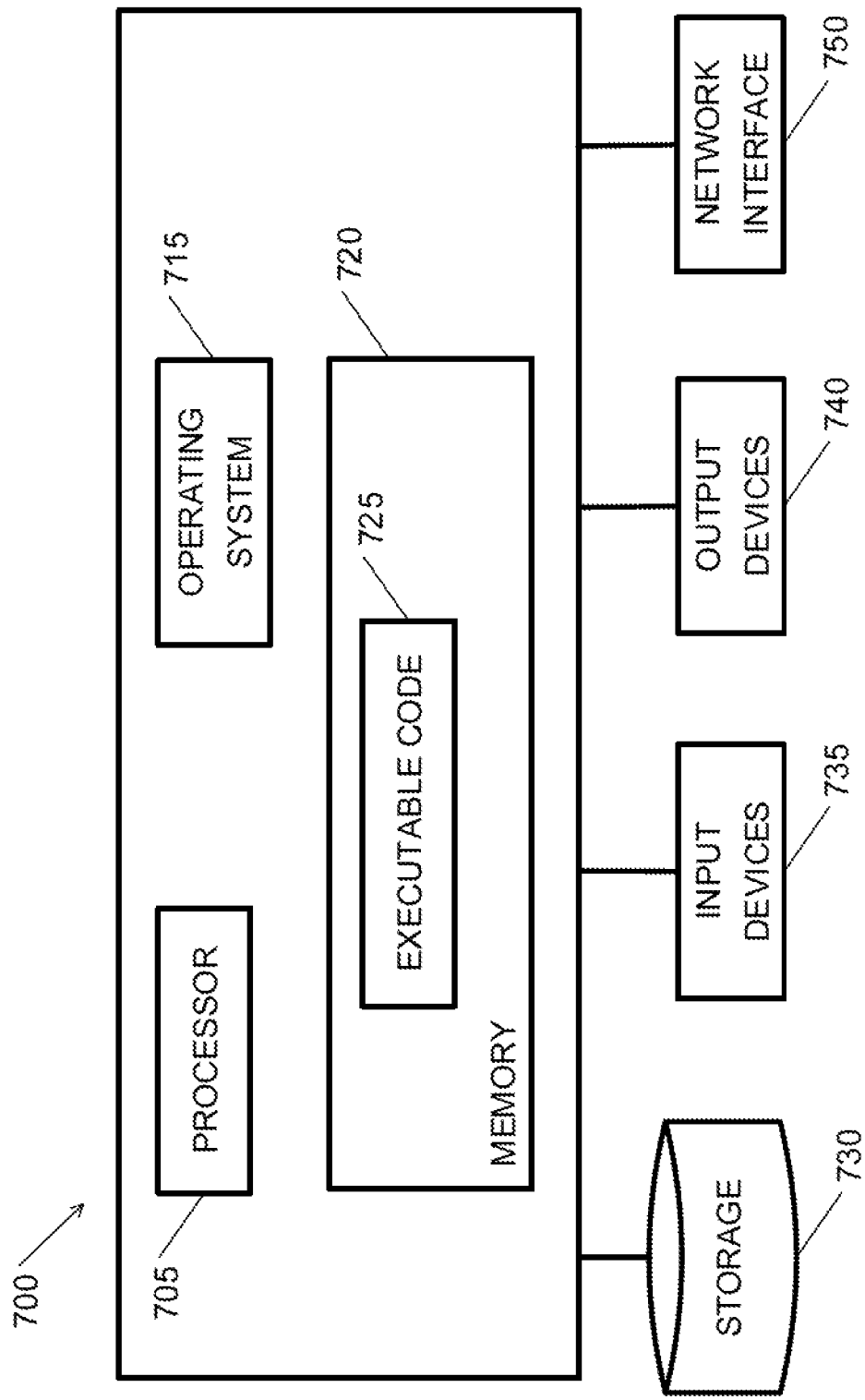
FIG. 7 illustrates an example computing device according to an embodiment of the invention.

FIG. 7 illustrates an example computing device according to an embodiment of the invention. For example, a computing device 700 with a processor 705 may be used to, synchronize a video signal with an audio signal according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a smart device, a smartphone, workstation or personal computer, a laptop, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program a process, task or script. Executable code 725 may be executed by processor 705 possibly under control of operating system 715. For example, executable code 725 may be or include synchronize a video signal with an audio signal, according to embodiments of the invention. In some embodiments, more than one computing devices 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a camera, a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM. ROM. EEPROM. CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context.

Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for synchronizing a video signal with an audio signal, the method comprising:
   extracting at least one parameter of an audible attribute of the audio signal;
   calculating a probability density function based on the audible attribute; and
   applying manipulations on the visual signal, based on the probability density function, by inserting at least one of one or more visual effects or one or more temporal effects to the visual signal to produce an altered video signal, wherein parameters of the manipulations are affected by the parameters of the audible attributes, wherein placement for each of the one or more visual effects or the one or more temporal effects is determined based on the probability density function.

2. The method of claim 1, wherein the probability density function is calculated by:
   generating at least one function wherein each of the at least one function provides, in each time point, the value of an audible attribute in relation to values of the audible attribute at all other time points in the audio signal; and
   calculating a weighted average of the at least one of function.

3. The method of claim 1, wherein applying manipulations on the visual signal comprise inserting at least one effect selected from a plurality of visual effects, wherein each of the visual effects comprise manipulations applied on the visual content of individual video frames of the video signal.

4. The method of claim 3, wherein the visual effects are selected from the list consisting of: color filters, image rotation, image zoom, edge amplification and overlays of external content.

5. The method of claim 1, wherein applying manipulations on the visual signal comprise inserting at least one effect selected from a plurality of temporal effects, wherein the temporal effects comprise manipulations of how the individual video frames of the video signal are sequenced over time.

6. The method of claim 5, wherein the temporal effects comprise interlacing frames taken from a plurality of sources.

7. The method of claim 5, wherein the temporal effects are selected from the list consisting of: speed change, changing the order of frames inside the video, transitions, repetitions, remixing of pixel locations, and reversal playback.

8. The method of claim 1, wherein the audible attributes comprise temporal characteristics of the audio signal.

9. The method of claim 1, wherein the audible attributes are selected from the list consisting of: audio intensity, beats, pitch energy, meter, auditory novelty, onset timing and sub sections, and functions applied to any of the attributes in the list.

10. The method of claim 1, wherein a probability of placing each of the one or more visual effects or the one or more temporal effects at a video frame equals the probability density function at the video frame.

11. A method for synchronizing a video clip with an audio signal, the method comprising:
    extracting at least one audio characteristic of the audio signal;
    calculating a probability density function based on the audible attribute; and
    using the audible characteristics to control visual properties of the video and to produce an altered video signal by inserting at least one of one or more visual effects or one or more temporal effects to the visual signal, wherein placement for each of the one or more visual effects or the one or more temporal effects is determined based on the probability density function.

12. A system for synchronizing a video signal with an audio signal, the system comprising:
    a memory; and
    a processor configured to:
    extract at least one parameter of an audible attribute of the audio signal;
    calculate a probability density function based on the audible attribute; and
    apply manipulations on the visual signal, based on the probability density function, by inserting at least one of one or more visual effects or one or more temporal effects to the visual signal to produce an altered video signal, wherein parameters of the manipulations are affected by the parameters of the audible attributes, wherein placement for each of the one or more visual effects or the one or more temporal effects is determined based on the probability density function.

13. The system of claim 12, wherein the processor is configured to calculate the probability density function by:
    generating at least one function wherein each of the at least one function provides, in each time point, the value of an audible attribute in relation to values of the audible attribute at all other time points in the audio signal; and
    calculating a weighted average of the at least one of function.

14. The system of claim 12, wherein the processor is configured to apply manipulations on the visual signal by inserting at least one effect selected from a plurality of visual effects, wherein each of the visual effects comprise manipulations applied on the visual content of individual video frames of the video signal.

15. The system of claim 14, wherein the visual effects are selected from the list consisting of: color filters, image rotation, image zoom, edge amplification and overlays of external content.

16. The system of claim 12, wherein the processor is configured to apply manipulations on the visual signal by inserting at least one effect selected from a plurality of temporal effects, wherein the temporal effects comprise manipulations of how the individual video frames of the video signal are sequenced over time.

17. The system of claim 16, wherein the temporal effects comprise interlacing frames taken from a plurality of sources.

18. The system of claim 16, wherein the temporal effects are selected from the list consisting of: speed change, changing the order of frames inside the video, transitions, repetitions, remixing of pixel locations, and reversal playback.

19. The system of claim 12, wherein the audible attributes are selected from the list consisting of: audio intensity, beats, pitch energy, meter, auditory novelty, onset timing and sub sections, and functions applied to any of the attributes in the list.

20. The system of claim 12, wherein a probability of placing each of the one or more visual effects or the one or more temporal effects at a video frame equals the probability density function at the video frame.

* * * * *